United States Patent [19]

Kawata et al.

[11] Patent Number: 4,794,269
[45] Date of Patent: Dec. 27, 1988

[54] LOAD CONTROLLER FOR AUTOMOBILE

[75] Inventors: Toshihiko Kawata, Furukawa; Ken Mizuta, Miyagi, both of Japan

[73] Assignee: Alps Electric Co., Ltd., Japan

[21] Appl. No.: 101,007

[22] Filed: Sep. 24, 1987

[30] Foreign Application Priority Data

Jan. 8, 1987 [JP] Japan .................. 62-1182[U]

[51] Int. Cl.⁴ .......................................... B62G 45/00
[52] U.S. Cl. ................................. 307/10 R; 307/9; 307/147; 340/52 F; 340/310 R
[58] Field of Search ............ 307/10 R, 9 R, 10 LS, 307/10 AT, 10 BP, 147, 148, 149; 340/52 R, 52 D, 74, 63, 310 R, 310 CP

[56] References Cited

U.S. PATENT DOCUMENTS

| | | | |
|---|---|---|---|
| 3,544,803 | 4/1968 | Taylor | 307/10 R |
| 3,651,454 | 3/1972 | Venema et al. | 307/10 R X |
| 3,715,627 | 2/1973 | D'Aussilio | 307/147 X |
| 3,952,209 | 4/1976 | Shaklee et al. | 307/9 |
| 4,034,271 | 7/1977 | Palazzetti et al. | 307/10 R X |
| 4,156,151 | 5/1979 | Borroni | 307/9 X |
| 4,367,417 | 1/1983 | Casasanta | 307/147 |
| 4,370,561 | 1/1983 | Briggs | 307/9 |
| 4,463,341 | 7/1984 | Iwasaki | 307/10 R X |
| 4,639,609 | 1/1987 | Floyd et al. | 307/10 R |
| 4,652,853 | 3/1987 | Tagami et al. | 307/10 R X |

Primary Examiner—William M. Shoop, Jr.
Assistant Examiner—Paul Ip
Attorney, Agent, or Firm—Guy W. Shoup; Paul J. Winters

[57] ABSTRACT

A load controller for an automobile comprising power lines of a pair of conducive members insulated as power supply line and ground line wired in an automotive room, a control unit including a switch circuit connected to the power line near a load for supplying power from the power line through the control unit to the load, thereby controlling the control unit by a control signal outputted from a microcomputer. Thus, the load controller can alleviate a labor of wirings of the power lines.

2 Claims, 4 Drawing Sheets

LOAD CONTROLLER FOR AUTOMOBILE

BACKGROUND OF THE INVENTION

1. Field of the Invention

This invention relates to a load controller for an automobile for controlling loads of the automobile such as a head lamp, a turning signal lamp and/or a wiper motor by a simple wiring structure.

2. Description of the Prior Art

Loads electrically provided in an automobile such as a head lamp and/or a turning signal lamp are electrically connected to an automotive battery via power lines connected via switch means. There has also been an arrangement in which loads electrically connected in an automobile are controlled by a driver to be controlled by signals outputted from a microcomputer.

The number of loads electrically connected in an automobile has been recently remarkably increased, the number of power lines provided corresponding to the loads has accordingly increased, and complicated wirings have been arranged. These power lines cannot be considerably reduced in thickness due to large drive currents of the loads. Thus, drawbacks exist in which relatively thick and a number of power lines must be wired in an automotive room, and wiring works are complicated.

SUMMARY OF THE INVENTION

Accordingly, an object of this invention is to provide a load controller for an automobile which can eliminate drawbacks of wirings of power lines for controlling loads electrically connected in a conventional automobile and which can alleviate a labor of wirings of the power lines.

In order to achieve the above and other objects of the invention, there is provided a load controller for an automobile comprising power lines of a pair of conducive members insulated as power supply line and ground line wired in an automotive room, a control unit including a switch circuit connected to the power line near a load for supplying power from the power line through the control unit to the load, thereby controlling the control unit by a control signal outputted from a microcomputer.

Since the power lines of the pair of conductive members insulated as the power supply line and the ground line are wired in the automotive room and power is supplied from the power line to the load through the control unit provided near the load in this load controller, the number of power lines for feeding drive currents of the loads can be reduced to be readily wired. A signal line for controlling the control unit may be fine to be more readily wired as compared with the conventional one.

The above and other related objects and features of the invention will be apparent from a reading of the following description of the disclosure found in the accompanying drawings and the novelty thereof pointed out in the appended claims.

DESCRIPTION OF THE PREFERRED EMBODIMENTS

Figure 1:
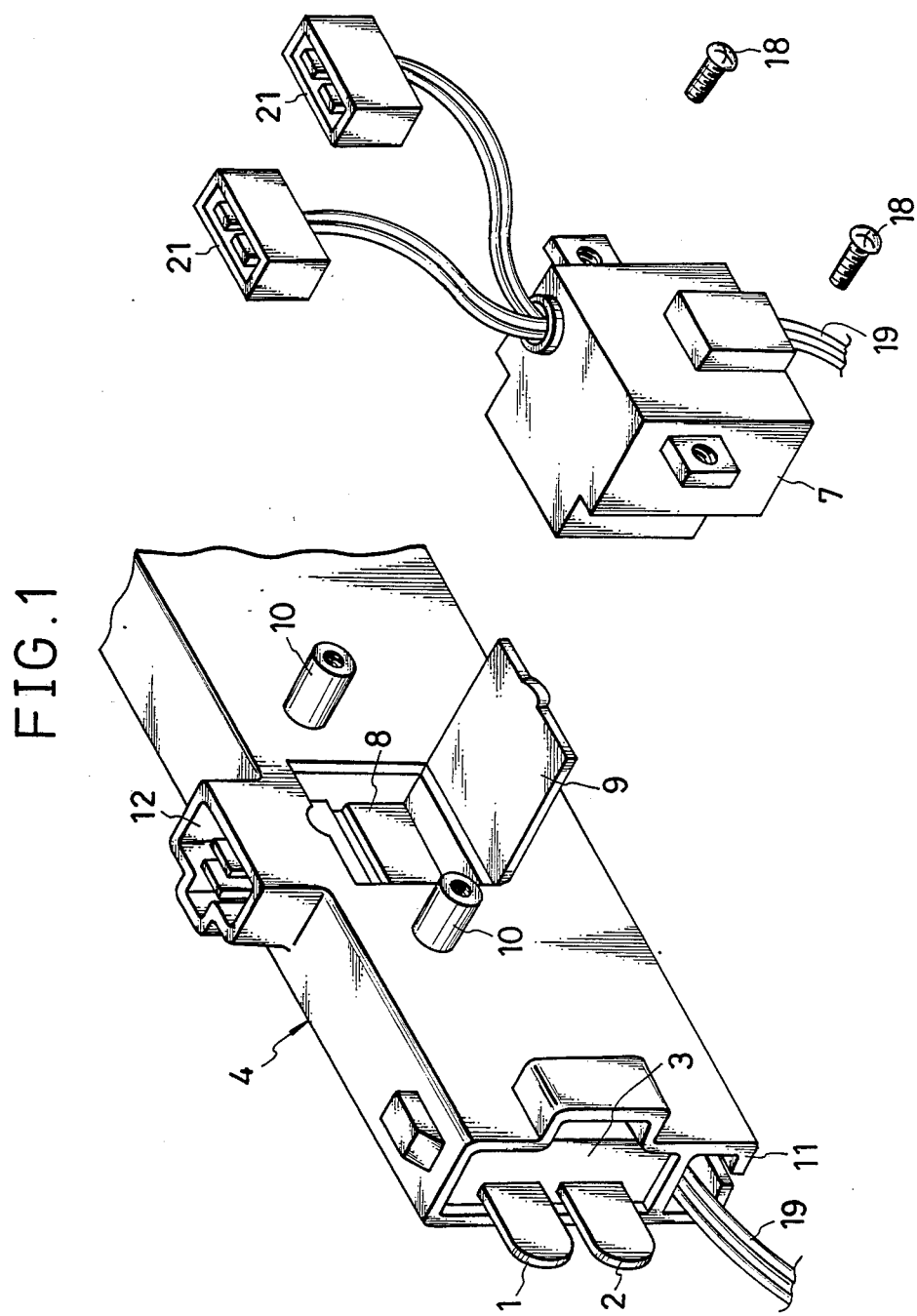
FIG. 1 is a perspective view of an external appearance of an embodiment of a load controller for an automobile according to the present invention.
Figure 4:
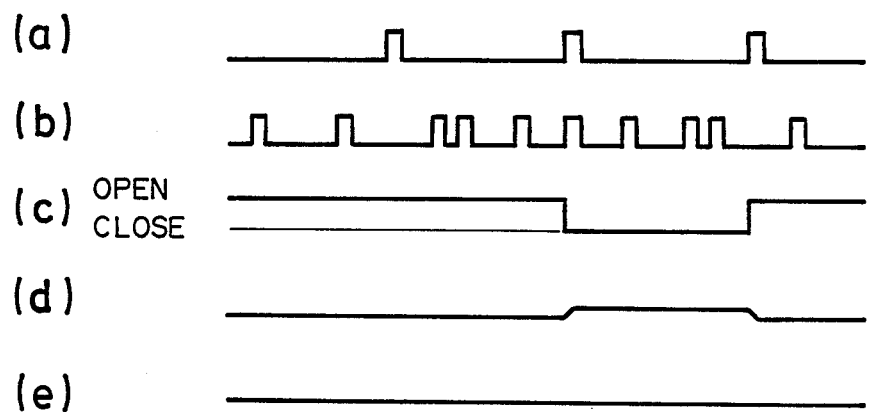
FIG. 4 is a timechart for describing the operation of FIG. 3 when the load is normal.
Figure 5:
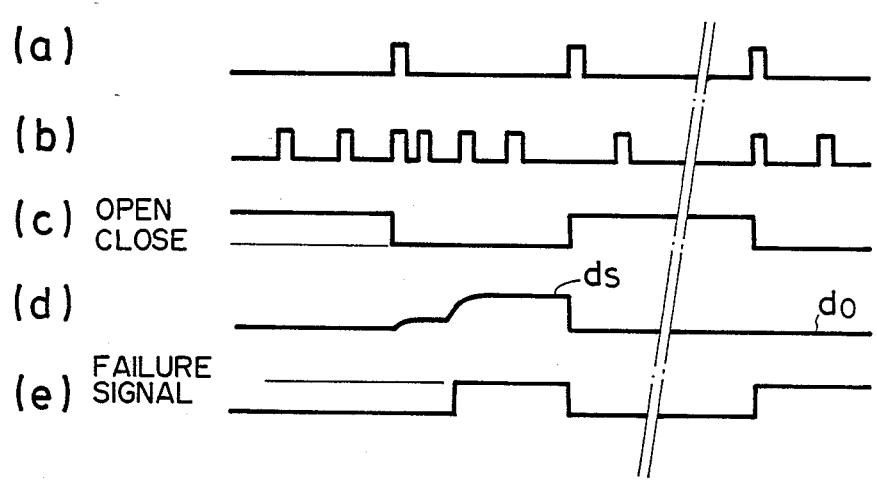
FIG. 5 is a timechart for describing the operation of FIG. 3 when the load is defective.

Embodiments of the present invention will be described in detail with reference to FIGS. 1 to 5. FIG. 1 is a perspective view of an external appearance of an embodiment of a load controller for an automobile according to the present invention, FIG. 2 is a schematic view of the load controller in FIG. 1 mounted in the automobile, FIG. 3 is a circuit diagram of a power line and a control unit of FIG. 1, FIG. 4 is a timechart for describing the operation of FIG. 3 when the load is normal; and FIG. 5 is a timechart for describing the operation of FIG. 3 when the load is defective.

Figure 2:
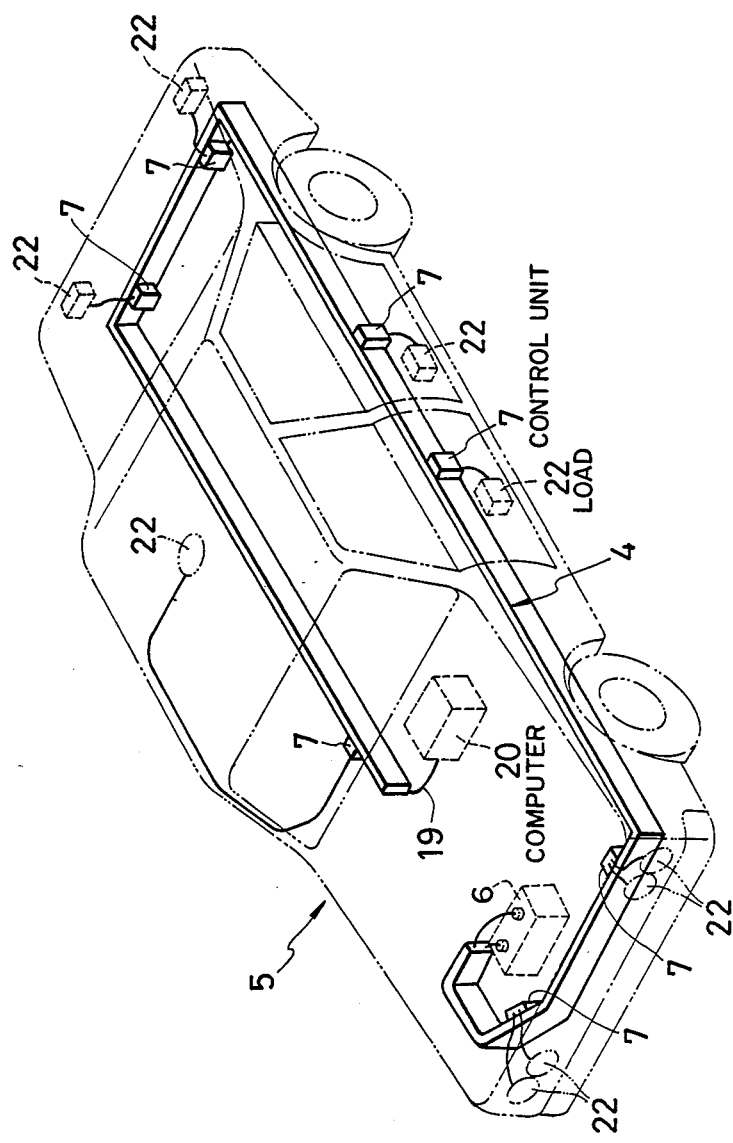
FIG. 2 is a schematic view of the load controller in FIG. 1 mounted in the automobile.
Figure 3:
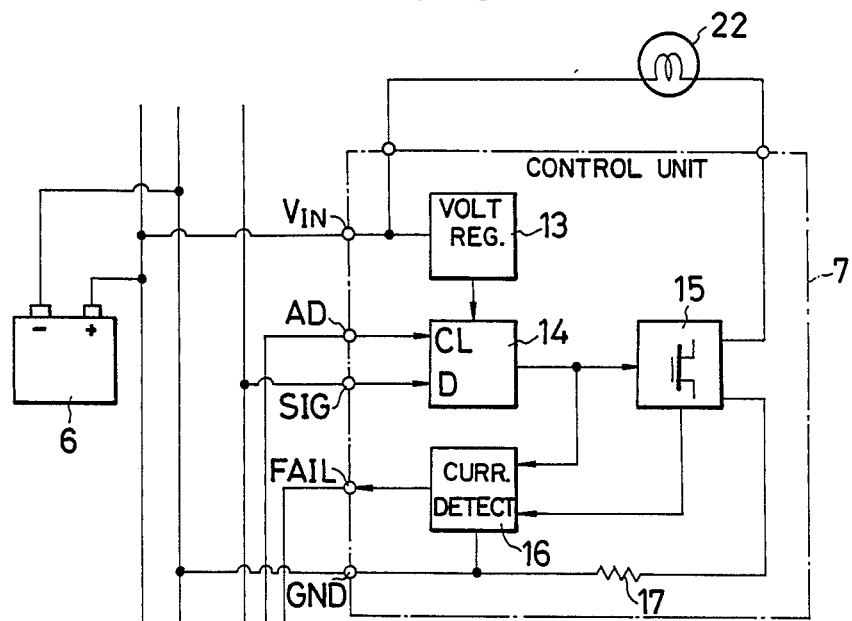
FIG. 3 is a circuit diagram of a power line and a control unit of FIG. 1.
Figure 3:
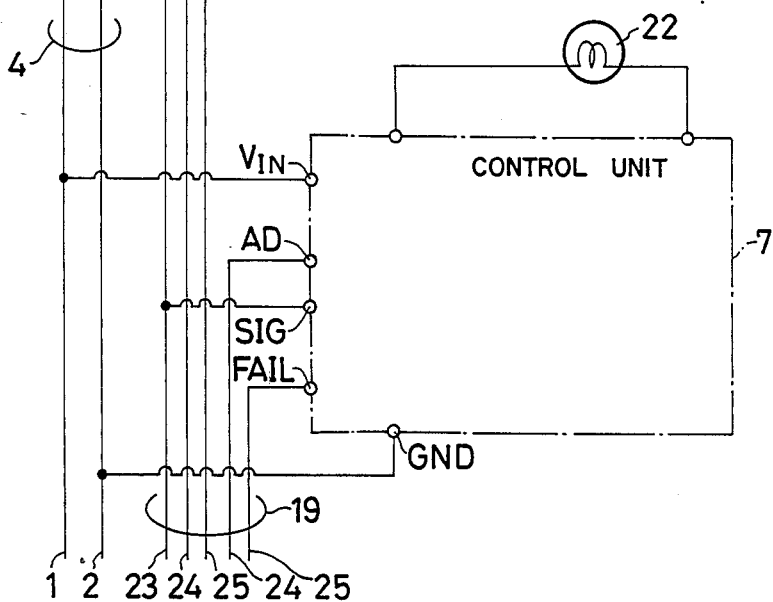

In FIGS. 1 to 3, the construction of the load controller of the invention will be first described. A pair of conductive members 1, 2 made of strips of electrically and thermally conductive materials such as copper are so integrally molded with an insulating material 3 in an insulated state to construct a power line 4. Then, the power line 4 is suitably wired in a room of an automobile 5, one conductive member 1 is electrically connected to a positive terminal of an automotive battery 6, and the other conductive member 2 is electrically connected to a negative terminal of the automotive battery 6. A plurality of connecting openings 8, 8, . . . are to be connected to control units 7, 7, . . . are formed in the power line 4. The connecting openings 8, 8, . . . have, for example, covers 9, 9, . . . capable of properly opening or closing themselves so that the pair of conductive members 1, 2 are partly exposed in the openings 8, 8, . . ., and clamping members 10, 10, . . . for the control units 7, 7, . . . are further provided. In addition, a C-shaped sectional signal line duct 11 formed integrally along the power line 4 is further provided, and a power supply plug socket 12 is also poovided. When suitable length of a plurality of power lines 4 are sequentially connected and adequately wired in the room of the automobile 5, an automobile 5 of different type can be commonly wired with the power lines as commonly.

Each of the control units 7, 7, . . . has a voltage regulator 13, a latch circuit 14 of a control circuit, a switch circuit 15 including a switching element such as an MOSFET, and a current detector 16 as unitized, as well as a resistor 17 externally attached thereto. The control units 7, 7, . . . are clamped by screws 18, 18, . . . to the power line 4, and thermally connected to the conductive members 1, 2 in which the switch circuit 15 is exposed, and are further connected to an automotive microcomputer 20 via a signal line bundle 19 contained in the signal line duct 1. Further, the control units 7, 7, . . . are connected via joints 21, 21, . . . to loads 22, 22, . . .

Then, the structure of each of the control units 7, 7, . . . will be described in detail. One conductive member 1 to become a power supply line is connected to a power input terminal $V_{IN}$, which is connected to one terminals of the voltage regulator 13 and the load 22. The other conductive member 2 to become a ground line is connected to a ground terminal GND, which is connected to the current detector 16, and is also connected through the resistor 17 to one terminal of the switch circuit 15. The other terminal of the switch circuit 15 is connected to the other terminal of the load 22. The signal line 23 from the microcomputer 20 is connected commonly to the signal terminals SIG of the plurality of control units 7, 7, . . . to apply signals to the data terminals D of the latch circuits 14, 14, . . . Individual address signal lines 24, 24, . . . are connected to address terminals AD of the control units 7, 7, . . . from the microcomputer 20 at every control unit 7 to apply address signals to the clock signals CL of the latch circuits 14, 14, . . . The output terminal of the current detector 16 is connected to a failure signal output terminal FAIL, which is connected through failure signal lines 25, 25, . . . to the microcomputer 20 at every control unit 7 to apply failure signals from the control units 7, 7, . . . to the microcomputer 20. The voltage regulated by the voltage regulator 13 to a predetermined value is supplied as a driving voltage to the latch circuit 14, the switch circuit 15 is controlled by the output of the latch circuit 14, and the current detector 15 outputs a failure signal when the potential difference across the resistor 17 is out of a predetermined range.

The operation of each of the control units 7, 7, . . . thus constructed as described above will be described with reference to FIGS. 4 and 5. Pulses of an address signal are applied to the control unit 7, 7, . . . as shown in FIG. 4(a) through the address signal lines 24, 24, . . . from the microcomputer 20. A common signal having a plurality of pulses arranged in series representing a timing for supplying power to the loads 22, 22, . . . is applied to the control units 7, 7, . . . through the signal line 23 as shown in FIG. 4(b). When the address signal and the signal pulses are simultaneously applied to the latch circuit 14, the latch circuit 14 closes the switch circuit 15 as shown in FIG. 4(c) to supply power to the corresponding load 22. When the load is normal at this time, a slight potential difference is generated across the resistor 17 as shown in FIG. 4(d) by a current flowing to the switch circuit 15 in a predetermined range, and the current detector 15 does not output a failure signal as shown in FIG. 4(e). When address signal pulses are then applied, the latch circuit 14 opens the switch circuit 15 to shut off the power of the load 22.

If the load 22 is shorted when the power is supplied to the load 22 as described above, a large current flows to the switch circuit 15 so that a potential difference $d_s$ across the resistor 17 becomes over a predetermined range as shown in FIG. 5(d), the current detector 16 detects it, and outputs a failure signal to the microcomputer 20 as shown in FIG. 5(e). If the load 22 is open when the power is supplied to the load 22, no current flows to the switch circuit 15, and the potential difference $d_0$ across the resistor 17 becomes zero as shown in FIG. 5(d). Then, the current detector 16 detects that the potential difference $d_0$ across the resistor 17 is within the predetermined range, and outputs a failure signal as shown in FIG. 5(e).

The microcomputer 20 to which the failure signals are applied, suitably lights an alarm lamp to display the failure and thereafter stops outputting the address signal to the control unit 7 connected to the failure load 22.

The heat generated from the switch circuit 15 due to the driving current flowing to the load 22 is dissipated through the conductive members 1, 2, and heat dissipating means is not necessarily separately provided in the switch circuit 15. The positions of the control units 7, 7, . . . can be selected in response to the positions where the loads 22, 22, . . . are arranged by providing the plurality of connecting openings 8, 8, . . . in the power line 4.

In the embodiment described above, one control unit 7 is correspondingly provided for one load 22. However, this invention is not limited to the particular embodiment. For example, a plrrality of the control unit 7 may be provided for a load 22 by considering the current capacity of the switch circuit 15. When the control units 7 are connected in parallel in this manner, common parts can be used for loads 22 of different capacities.

According to the present invention as described above, the load controller for the automobile does not need a number of power lines for supplying power to the loads to be readily wired.

What is claimed is:

1. A load controller for providing power to a load from a common power line connected to a battery power source in an automobile, comprising:
   said common power line being formed by a pair of conductor strips made of electrically and thermally conductive material which are arranged in parallel in an insulator body, wherein said insulator body is provided with preformed openings at selected positions thereof, and wherein each of said openings exposes respective contact surfaces of said pair of conductor strips in said insulator body;
   a control unit adapted to be connected to said power line through any one of said openings at the corresponding selected position thereof, said control unit including:
   (a) a housing having one end adapted to be inserted in said opening in said insulator body of said common power line,
   (b) mounting means on said housing for mounting said control unit in position at said opening of said common power line,
   (c) a switch in said housing having a pair of contacts exposed through said one end of said housing for electrically and thermally conductive contact with the respective exposed surfaces of said pair of conductor strips and a pair of terminals which are selectively connected ON/OFF with said contacts in accordance with a control signal provided to said switch,
   (d) a connector electrically connecting the terminals of said switch to a load associated with said control unit, and
   (e) signal line means connected to said switch for providing a control signal thereto from a controller in the automobile in order to switch said control unit in ON/OFF connection with said common power line,
   wherein said exposed contacts of said switch and said exposed surfaces of said conductor strips of said common power line provide a heat dissipation structure for dissipating heat through said conductor strips which is generated in said switch by current flowing through the switch to a load connected thereto via said connector of said control unit.

2. A load controller according to claim 1, wherein said control unit includes a current detector for detecting when current flowing through said switch is within a normal range and for providing a failure signal to the controller in the automobile when the current flowing through said switch is outside of the normal range, in order to allow the controller thereupon to provide a control signal to shut said switch OFF and disconnect the power supplied to the corresponding load.

* * * * *